US009681205B1

(12) United States Patent
    Yang

(10) Patent No.: US 9,681,205 B1
(45) Date of Patent: Jun. 13, 2017

(54) PAIRING A HEALTH-MONITORING WIRELESS SENSOR DEVICE USING A CONTACT MOTION

(75) Inventor: Yun Yang, Los Altos, CA (US)

(73) Assignee: Vital Connect, Inc., San Jose, CA (US)

( * ) Notice: Subject to any disclaimer, the term of this patent is extended or adjusted under 35 U.S.C. 154(b) by 989 days.

(21) Appl. No.: 13/353,234

(22) Filed: Jan. 18, 2012

(51) Int. Cl.
   *H04Q 5/22*   (2006.01)
   *H04B 5/00*   (2006.01)
   *A61B 5/04*   (2006.01)

(52) U.S. Cl.
   CPC ................................. *H04Q 5/22* (2013.01)

(58) Field of Classification Search
   CPC ..................................... H05B 6/062
   USPC ........................................ 340/10.1
   See application file for complete search history.

(56) References Cited

U.S. PATENT DOCUMENTS

| 8,190,651 | B2 * | 5/2012 | Treu ................... G06F 19/3418 |
| | | | 707/802 |
| 8,340,007 | B2 * | 12/2012 | Lu et al. ....................... 370/310 |
| 8,432,262 | B2 * | 4/2013 | Talty et al. ................ 340/10.51 |
| 8,449,523 | B2 * | 5/2013 | Brukalo et al. ................ 604/504 |
| 8,718,742 | B2 * | 5/2014 | Beck .................... A61B 5/0006 |
| | | | 600/391 |
| 2005/0136901 | A1 * | 6/2005 | Jung et al. .................... 455/415 |
| 2007/0223476 | A1 * | 9/2007 | Fry ................... H04L 29/12254 |
| | | | 370/392 |
| 2008/0058900 | A1 * | 3/2008 | Berthelsdorf ........ A61B 5/0031 |
| | | | 607/59 |
| 2009/0240118 | A1 * | 9/2009 | Aggarwal ...................... 600/301 |
| 2010/0049006 | A1 * | 2/2010 | Magar .................. A61B 5/0024 |
| | | | 600/301 |
| 2011/0070829 | A1 * | 3/2011 | Griffin ..................... H04B 5/02 |
| | | | 455/41.1 |
| 2011/0319016 | A1 * | 12/2011 | Gormley .............. H04B 5/0012 |
| | | | 455/41.1 |
| 2012/0015605 | A1 * | 1/2012 | Sole ............................ 455/41.3 |

FOREIGN PATENT DOCUMENTS

EP       1635508 A1 *   3/2006    ............. H04L 12/28

* cited by examiner

*Primary Examiner* — Joseph Feild
*Assistant Examiner* — John Mortell
(74) *Attorney, Agent, or Firm* — Brundidge & Stanger, P.C.

(57) ABSTRACT

A method, system, and a computer-readable medium for pairing a wireless sensor device with a mobile device are disclosed. In a first aspect, the method comprises providing a code within the wireless sensor device. The method includes contacting the mobile device against the wireless sensor device. In response to the contacting, the mobile device receives the code and is paired with the wireless sensor device. In a second aspect, the system comprises a processing system and an application to be executed by the processing system. In response to a contacting of the mobile device against a wireless sensor device, the application receives a code from the wireless sensor device and pairs the mobile device with the wireless sensor device.

20 Claims, 2 Drawing Sheets

PAIRING A HEALTH-MONITORING WIRELESS SENSOR DEVICE USING A CONTACT MOTION

FIELD OF THE INVENTION

The present invention relates to wireless sensor devices, and more particularly, to pairing a wireless sensor device with a mobile device using a contacting motion.

BACKGROUND

Wireless sensor devices are used in a variety of applications including the health monitoring of individuals. Registration of these wireless sensor devices is essential to enabling the proper recordation of pertinent health related data and information of a user. Manual registration of the wireless sensor device to the user is an option but requires the knowledge of the unique network address of each wireless sensor device and is thus inefficient, time consuming and costly. Additionally, due to the abundance of wireless signals emitting from various devices, wirelessly pairing the wireless sensor device with a mobile device can be ineffective and inaccurate.

These issues limit the usage tracking and the pairing of wireless sensor devices to mobile devices and users. Therefore, there is a strong need for a cost-effective solution that overcomes the above issues by pairing a wireless sensor device with a mobile device without having to know the unique network address of the wireless sensor device. The present invention addresses such a need.

SUMMARY OF THE INVENTION

A method, system, and a computer-readable medium for pairing a wireless sensor device with a mobile device are disclosed. In a first aspect, the method comprises providing a code within the wireless sensor device. The method includes contacting the mobile device against the wireless sensor device. In response to the contacting, the mobile device receives the code and is paired with the wireless sensor device.

In a second aspect, the system comprises a processing system and an application to be executed by the processing system. In response to a contacting of the mobile device against a wireless sensor device, the application receives a code from the wireless sensor device and pairs the mobile device with the wireless sensor device.

In a third aspect, the computer-readable medium comprises providing a code within the wireless sensor device. The computer-readable medium includes contacting the mobile device against the wireless sensor device. In response to the contacting, the mobile device receives the code and is paired with the wireless sensor device.

BRIEF DESCRIPTION OF THE DRAWINGS

The accompanying figures illustrate several embodiments of the invention and, together with the description, serve to explain the principles of the invention. One of ordinary skill in the art will recognize that the particular embodiments illustrated in the figures are merely exemplary, and are not intended to limit the scope of the present invention.

DETAILED DESCRIPTION OF PREFERRED EMBODIMENTS

The present invention relates to wireless sensor devices, and more particularly, to pairing a wireless sensor device with a mobile device using a contacting motion. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

A method, system, and computer-readable medium in accordance with the present invention allows for a wireless sensor device to be seamlessly paired with a mobile device using contact recognition. By implementing sensors within the wireless sensor device and the mobile device and an application within the mobile device, an efficient and cost-effective pairing system is achieved that can support a significant number of contacting motions and devices. One of ordinary skill in the art readily recognizes that a variety of wireless sensor devices may be utilized by the pairing system and that would be within the spirit and scope of the present invention.

To describe the features of the present invention in more detail, refer now to the following description in conjunction with the accompanying Figures.

In one embodiment, a wireless sensor device is attached to a user and continuously and automatically obtains data associated with the user. An application embedded within a processor of a mobile device is opened which displays a simple instruction and illustration detailing how to utilize a tapping motion to pair the mobile device with the wireless sensor device. The user taps the mobile device directly and gently against the wireless sensor device to transmit a detection code from the wireless sensor device to the mobile device. In response to receiving the detection code, the mobile device is paired with the wireless sensor device.

Figure 1:
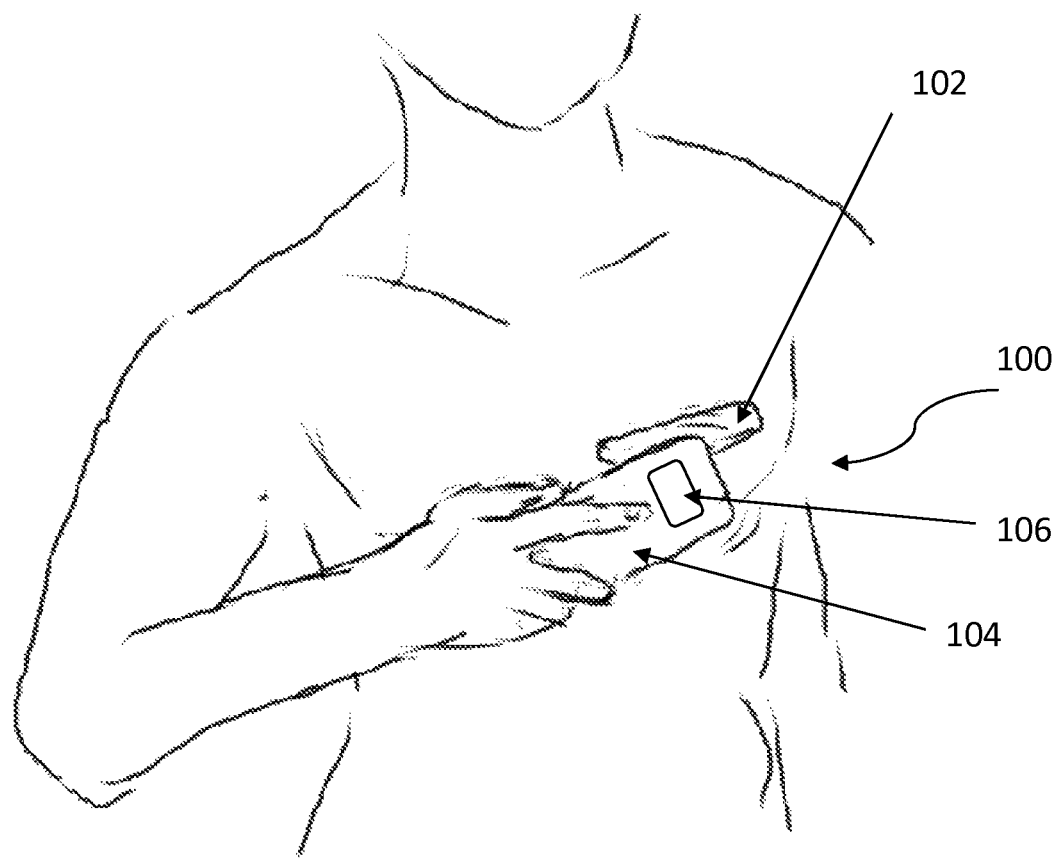
FIG. 1 illustrates a system in accordance with an embodiment.

FIG. 1 illustrates a system 100 in accordance with an embodiment. The system 100 includes a wireless sensor device 102, a mobile device 104, and an application 106 coupled to the mobile device 104. One of ordinary skill in the art readily recognizes that the wireless sensor device 102 and the mobile device 104 can be represented by a variety of devices including but not limited to health monitoring sensors, cell phones, and cameras and that would be within the spirit and scope of the present invention. In addition, one of ordinary skill in the art readily recognizes that the wireless sensor device 102 can be represented by a variety of forms including but not limited to a patch.

In one embodiment, both the wireless sensor device 102 and the mobile device 104 are equipped with a sensor. One of ordinary skill in the art readily recognizes that the wireless sensor device 102 and the mobile device 104 can utilize a variety of devices for the sensor including but not limited to uni-axial accelerometers, bi-axial accelerometers, tri-axial accelerometers, microelectromechanical system (MEMS) tri-axial accelerometers, gyroscopes, and pressure sensors and that would be within the spirit and scope of the present invention.

Figure 2:
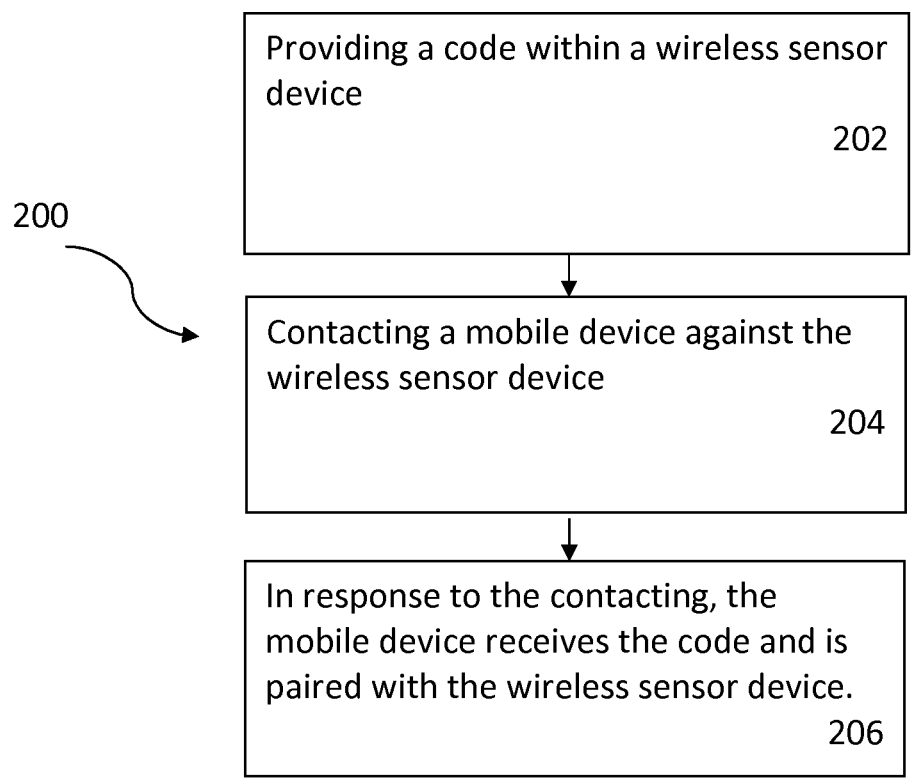
FIG. 2 illustrates a flow chart of a method for pairing a wireless sensor device with a mobile device in accordance with an embodiment.

FIG. 2 illustrates a flow chart 200 of a method for pairing a wireless sensor device with a mobile device in accordance with an embodiment. Referring to FIGS. 1 and 2 together, a code is provided within the wireless sensor device 102, via step 202. One of ordinary skill in the art readily recognizes that the code can be represented by a variety of codes including but not limited to an advertising packet with a unique signature or a bit set. In one embodiment, the code is an advertising packet with a tap_detected bit set.

The mobile device 104 is physically contacted against the wireless sensor device 102, via step 204. One of ordinary skill in the art readily recognizes that the contacting can be accomplished in a variety of ways including but not limited to a tapping between the mobile device 104 and the wireless sensor device 102 and a shaking of the mobile device 104 and the wireless sensor device 102 together for a predetermined time period and that would be within the spirit and scope of the present invention. In response to the contacting, the mobile device 104 receives the code from the wireless sensor device 102 and the pairing of the mobile device 104 with the wireless sensor device 102 is completed, via step 206.

In one embodiment, step 204 includes utilizing the application 106 coupled to the mobile device 104 to display an instruction to a user on how to perform the tapping and tapping the mobile device 104 at least twice against the wireless sensor device 102. One of ordinary skill in the art readily recognizes that the mobile device 104 can be tapped in a variety of different patterns against the wireless sensor device 102 to increase the fault tolerance including but not limited to tapping two times or tapping three times and that would be within the spirit and scope of the present invention.

In one embodiment, step 206 includes detecting the tapping motion by both the sensor within the wireless sensor device 102 and the sensor within the mobile device 104. In response to the detecting, the mobile device 104 scans for codes provided within devices within a predetermined proximity and the wireless sensor device 102 advertises the code to devices within a predetermined proximity.

In one embodiment, the wireless sensor device 102 only begins advertising the code in response to detecting the tapping motion and the mobile device 104 only begins scanning for codes in response to detecting the tapping motion. In one embodiment, the mobile device 104 scans for codes provided within the devices using a Bluetooth Low Energy scan mode and the wireless sensor device 102 advertises the code to the devices using a Bluetooth Low Energy advertise mode.

Once the mobile device 104 scans the wireless sensor device 102 that is advertising the code, step 206 further includes transmitting the code from the wireless sensor device 102 to the mobile device 104 and initiating a connection between the wireless sensor device 102 and the mobile device 104. In one embodiment, initiating a connection includes transmitting a connection request from the mobile device 104 to the wireless sensor device 102 and accepting the connection request by the wireless sensor device 102, wherein the mobile device 104 is paired with the wireless sensor device 102.

The tapping motion involves both the wireless sensor device 102 and the mobile device 104, so the detection results are fully synchronous. One of ordinary skill in the art readily recognizes that the time it takes starting from detecting the tapping motion on the wireless sensor device 102 and ending with the mobile device 104 receiving the code from the wireless sensor device 102 is typically short including but not limited to less than 100 milliseconds (ms) and that would be within the spirit and scope of the present invention.

In one embodiment, a predetermined time period for scanning the codes provided on the devices is implemented on the mobile device 104. In this embodiment, the code must be transmitted from the wireless sensor device 102 to the mobile device 104 within the predetermined time period. One of ordinary skill in the art readily recognizes that the predetermined time period can be a variety of different times including but not limited to 250 ms and that would be within the spirit and scope of the present invention.

By implementing the predetermined time period, the probability that the mobile device 104 will falsely recognize another wireless sensor device or will receive multiple codes is decreased. If the mobile device 104 does not receive the code from the wireless sensor device 102 within the predetermined time period or if the mobile device 104 receives a plurality of codes from various devices within the predetermined time period, then the application 106 coupled to the mobile device 104 aborts the pairing process and displays an error message to the user to retry the pairing process.

As above described, the method and system allow for a pairing of a wireless sensor device with a mobile device using a contacting motion. By implementing sensors within both the wireless sensor device and the mobile device and an advertising packet within the wireless sensor device, a contact between the wireless sensor device and the mobile device that causes a vibration is detected which initiates the transmittance of the advertising packet from the wireless sensor device to the mobile device to establish a connection between the two devices. The connection between the wireless sensor device and the mobile device is established efficiently and a cost-effective and fault tolerant wireless sensor device pairing system is achieved.

A method and system for pairing a wireless sensor device with a mobile device using a contacting motion has been disclosed. Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code or program instructions for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-RAN).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for pairing a wireless sensor device with a mobile device, the method comprising:
   providing a code within the wireless sensor device, wherein the wireless sensor device is health-monitoring and in a wearable patch form; and
   contacting the mobile device against the wireless sensor device to initiate the pairing, wherein the wireless sensor device only begins periodically advertising the code for a predetermined time period of approximately 250 milliseconds (ms) in response to detecting the contacting and the mobile device only begins periodically scanning for codes for the predetermined time period of approximately 250 milliseconds (ms) in response to detecting the contacting;
   wherein in response to the mobile device scanning the code of the wireless sensor device within the predetermined time period of approximately 250 milliseconds (ms), receiving, by the mobile device, the code to complete the pairing with the wireless sensor device.

2. The method of claim 1, wherein the contacting comprises tapping the mobile device against the wireless sensor device or shaking both the mobile device and the wireless sensor device together.

3. The method of claim 1, wherein the contacting further comprises:
   utilizing an application on the mobile device, wherein the application displays an instruction to a user to perform a tapping; and
   tapping the mobile device at least twice against the wireless sensor device.

4. The method of claim 3, wherein in response to the tapping, the method further comprises:
   detecting the tapping, wherein in response to the detecting, the mobile device scans for devices and the wireless sensor device advertises the code;
   transmitting the code from the wireless sensor device to the mobile device; and
   initiating a connection between the wireless sensor device and the mobile device.

5. The method of claim 4, wherein the initiating further comprises:
   transmitting a connection request from the mobile device to the wireless sensor device; and
   accepting the connection request, wherein the mobile device is paired with the wireless sensor device.

6. The method of claim 4, wherein the mobile device scanning for devices further comprises:
   scanning for codes provided within the devices.

7. The method of claim 4, further comprising:
   transmitting the code from the wireless sensor device to the mobile device within the predetermined time period; and
   wherein if the mobile device does not receive the code within the predetermined time period or if the mobile device receives a plurality of codes, aborting the pairing and displaying a retry message on the application to the user.

8. The method of claim 1, wherein the code is an advertising packet with a tap_detected bit set.

9. The method of claim 1, wherein both the wireless sensor device and the mobile device include an accelerometer.

10. The method of claim 9, wherein the accelerometer is a tri-axial accelerometer.

11. A mobile device comprising:
    a processing system; and
    an application to be executed by the processing system;
    wherein only in response to a contacting of the mobile device against a wireless sensor device to initiate a pairing with the wireless sensor device, the wireless sensor device begins periodically advertising a code for a predetermined time period of approximately 250 milliseconds (ms) and the mobile device begins periodically scanning for codes for the predetermined time period of approximately 250 milliseconds (ms), further wherein when the mobile device scans the code of the wireless sensor device within the predetermined time period of approximately 250 milliseconds (ms), the application receives the code from the wireless sensor device and completes the pairing of the mobile device with the wireless sensor device, wherein the wireless sensor device is health-monitoring and in a wearable patch form.

12. The mobile device of claim 11, wherein the application further:
    displays an instruction to a user to perform the contacting, wherein the contacting is tapping the mobile device at least twice against the wireless sensor device or shaking both the mobile device and the wireless sensor device together.

13. The mobile device of claim 12, wherein the application further:
    detects the tapping;
    scans for codes provided within devices;
    receives the code from the wireless sensor device; and
    initiates a connection with the wireless sensor device.

14. The mobile device of claim 13, wherein the application further:
    transmits a connection request from the mobile device to the wireless sensor device; and
    wherein in response to an acceptance of the connection request, pairs the mobile device with the wireless sensor device.

15. The mobile device of claim 13, wherein the application further:
    receives the code from the wireless sensor device within the predetermined time period.

16. The mobile device of claim 15, wherein the application further:
    displays a retry message to the user if the application does not receive the code within the predetermined time period.

17. The mobile device of claim 15, wherein the application further:
    displays a retry message to the user if the application receives a plurality of codes.

18. The mobile device of claim 11, wherein the code is an advertising packet with a tap_detected bit set.

19. The mobile device of claim 11, wherein both the wireless sensor device and the mobile device include a tri-axial accelerometer.

20. A non-transitory computer-readable medium containing program instructions for pairing a wireless sensor device with a mobile device, wherein execution of the program instructions by one or more processors of a computer causes the one or more processors to carry out the steps of:
  providing a code within the wireless sensor device, wherein the wireless sensor device is health-monitoring and in a wearable patch form; and
  contacting the mobile device against the wireless sensor device to initiate the pairing in response to a fully synchronous detection of the contacting, wherein the wireless sensor device only begins periodically advertising the code for a predetermined time period of approximately 250 milliseconds (ms) in response to detecting the contacting and the mobile device only begins scanning for codes for the predetermined time period of approximately 250 milliseconds (ms) in response to detecting the contacting;
  wherein in response to the mobile device scanning the code of the wireless sensor device within the predetermined time period of approximately 250 milliseconds (ms), receiving, by the mobile device, the code to complete the pairing with the wireless sensor device.

* * * * *